(12) United States Patent
Moldoveanu et al.

(10) Patent No.: US 7,400,552 B2
(45) Date of Patent: Jul. 15, 2008

(54) METHODS AND SYSTEMS FOR EFFICIENTLY ACQUIRING TOWED STREAMER SEISMIC SURVEYS

(75) Inventors: Nicolae Moldoveanu, Houston, TX (US); Alan Strudley, Barns Green (GB)

(73) Assignee: WesternGeco L.L.C., Houston, TX (US)

( * ) Notice: Subject to any disclaimer, the term of this patent is extended or adjusted under 35 U.S.C. 154(b) by 113 days.

(21) Appl. No.: 11/335,365

(22) Filed: Jan. 19, 2006

(65) Prior Publication Data

US 2007/0165486 A1 Jul. 19, 2007

(51) Int. Cl.
*G01V 1/38* (2006.01)
(52) U.S. Cl. .......................... 367/16; 702/14
(58) Field of Classification Search ......... 367/110–113, 367/16; 702/14
See application file for complete search history.

(56) References Cited

U.S. PATENT DOCUMENTS

| | | | |
|---|---|---|---|
| 2,693,862 A | 11/1954 | Rieber | |
| 3,560,912 A | 2/1971 | Spink et al. | |
| 3,605,674 A | 9/1971 | Weese | |
| 3,774,570 A | 11/1973 | Pearson | |
| 3,934,220 A | 1/1976 | Davis | |
| 4,404,664 A | 9/1983 | Zachariadis | |
| 4,803,668 A | 2/1989 | Berryhill et al. | |
| 4,834,181 A | 5/1989 | Uhri et al. | |
| 4,942,991 A | 7/1990 | Lyons | |
| 4,965,773 A | 10/1990 | Prakla-Seismos | |
| 4,970,696 A * | 11/1990 | Crews et al. | 367/15 |
| 4,992,990 A * | 2/1991 | Langeland et al. | 367/19 |
| 4,992,991 A | 2/1991 | Young et al. | |
| 5,128,904 A * | 7/1992 | Chambers | 367/129 |
| 5,300,929 A | 4/1994 | MacLeod | |
| 5,430,689 A | 7/1995 | Rigsby et al. | |

(Continued)

FOREIGN PATENT DOCUMENTS

EP 0 613 025 A1 8/1994

(Continued)

OTHER PUBLICATIONS

PGS Geophysical. Wide-Tow Streamer 3D Acquisition: Fundamentals. vol. 5. No. 6. Aug. 2005.*

(Continued)

*Primary Examiner*—Deandra M Hughes
(74) *Attorney, Agent, or Firm*—Jeffrey L. Wendt; Liangang (Mark) Ye; Jeffrey E. Griffin

(57) ABSTRACT

Methods and systems for efficiently acquiring towed streamer marine seismic data are described. One method and system comprises positioning a plurality of source-only tow vessels and one or more source-streamer tow vessels to acquire a wide- and/or full-azimuth seismic survey without need for the spread to repeat a path once traversed. Another method and system allows surveying a sub-sea geologic feature using a marine seismic spread, the spread smartly negotiating at least one turn during the surveying, and shooting and recording during the turn. This abstract is provided to comply with the rules requiring an abstract, allowing a searcher or other reader to quickly ascertain the subject matter of the technical disclosure. It is submitted with the understanding that it will not be used to interpret or limit the scope or meaning of the claims. 37 CFR 1.72(b).

15 Claims, 9 Drawing Sheets

U.S. PATENT DOCUMENTS

| | | | |
|---|---|---|---|
| 5,443,027 A | 8/1995 | Owsley et al. | |
| 5,508,973 A | 4/1996 | Mallick et al. | |
| 5,555,531 A | 9/1996 | Booth et al. | |
| 5,668,775 A | 9/1997 | Hatteland | |
| 5,682,357 A * | 10/1997 | Rigsby | 367/15 |
| 5,761,152 A | 6/1998 | Jacobsen et al. | |
| 6,028,817 A * | 2/2000 | Ambs | 367/16 |
| 6,044,040 A | 3/2000 | Holland | |
| 6,175,809 B1 | 1/2001 | Naville | |
| 6,178,381 B1 | 1/2001 | Padhi et al. | |
| 6,285,956 B1 * | 9/2001 | Bennett et al. | 702/14 |
| 6,292,754 B1 | 9/2001 | Thomsen | |
| 6,343,256 B1 | 1/2002 | Winbow et al. | |
| 6,525,992 B1 | 2/2003 | Olivier et al. | |
| 6,529,832 B1 | 3/2003 | Kerekes | |
| 6,553,315 B2 | 4/2003 | Kerekes et al. | |
| 6,590,831 B1 * | 7/2003 | Bennett et al. | 367/16 |
| 6,671,223 B2 | 12/2003 | Bittleston | |
| 6,714,873 B2 | 3/2004 | Bakulin et al. | |
| 6,862,531 B2 | 3/2005 | Horne et al. | |
| 6,944,094 B1 | 9/2005 | Thomsen et al. | |
| 2003/0067842 A1 | 4/2003 | Sukup et al. | |
| 2003/0125878 A1 | 7/2003 | Bakulin et al. | |
| 2004/0042341 A1 | 3/2004 | Tenghamn et al. | |
| 2004/0066707 A1 | 4/2004 | Tenghamn et al. | |
| 2005/0180260 A1 | 8/2005 | Planke et al. | |
| 2006/0155476 A1 * | 7/2006 | Abma | 702/14 |
| 2006/0155477 A1 * | 7/2006 | Matson et al. | 702/14 |
| 2007/0159921 A1 * | 7/2007 | Ragone et al. | 367/15 |

FOREIGN PATENT DOCUMENTS

EP  0 613 025 B1  8/1994

OTHER PUBLICATIONS

Fontana, Phillip m. CGGVeritas. Wide-Azimuth streamer acquistion offers a bright future for finding new reserves in complex geologic settings. http://www.eandp.info.*

Qin and Badgwell, "An Overview of Industrial Model Predictive Control Technology," URL: http://www.che.utexas.edu/lqin.cpcv/cpcv14.html, pp. 1-2, 1996.

WesternGeco, Q-Technology, URL: http://www.westerngeco.com/content/services/q_technology/index.asp?

Sukup, Wide Azimuth Marine Acquisition by the Helix Method.

* cited by examiner

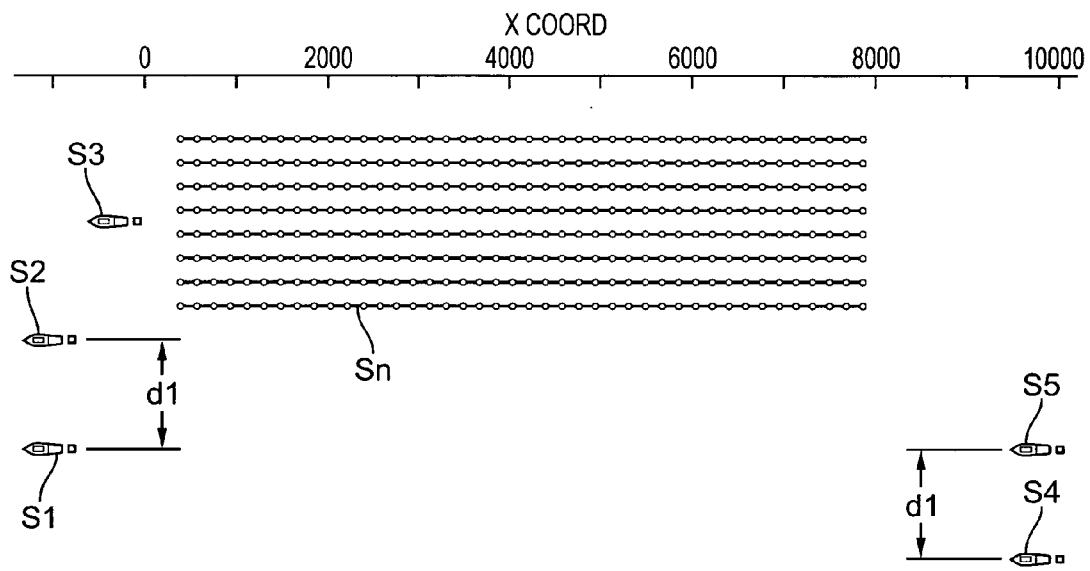
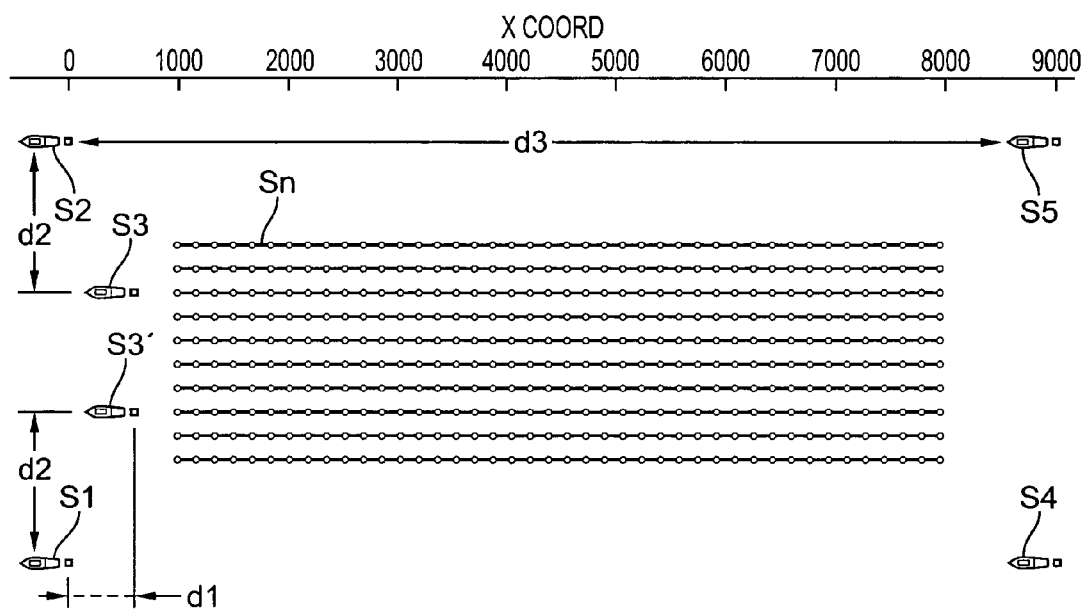

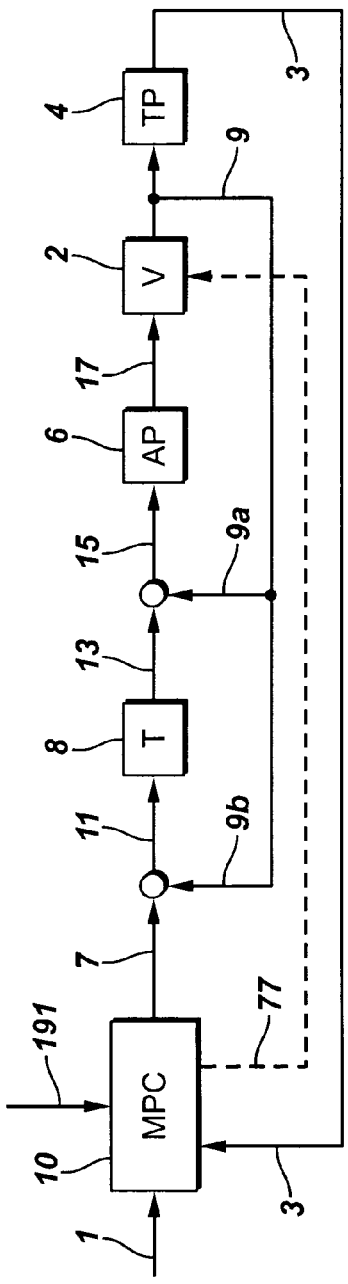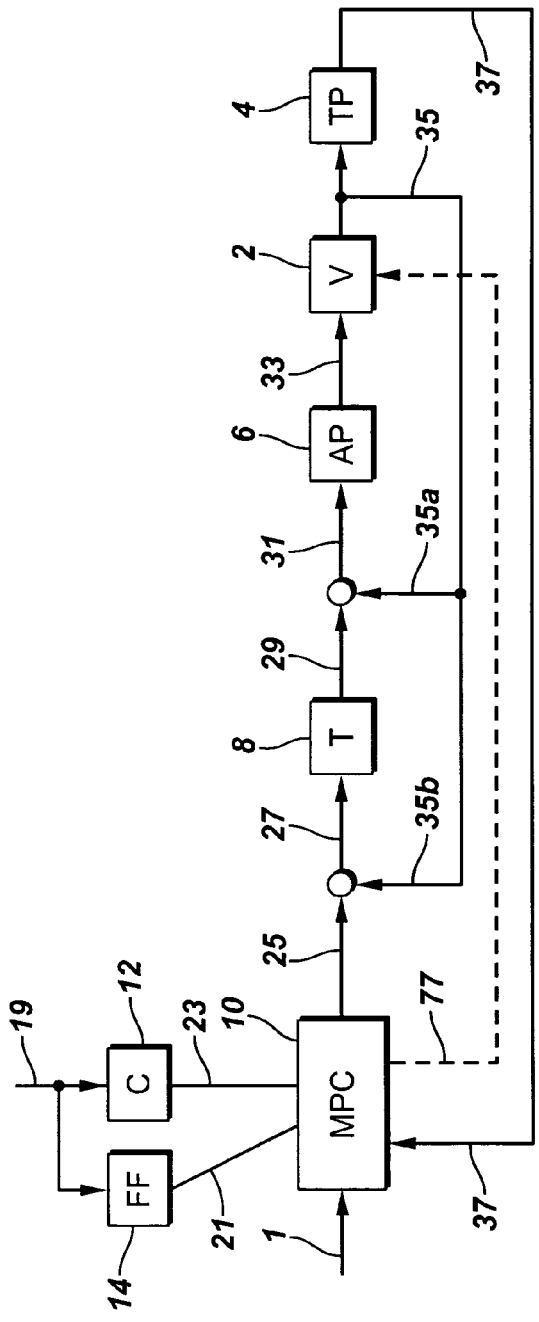

METHODS AND SYSTEMS FOR EFFICIENTLY ACQUIRING TOWED STREAMER SEISMIC SURVEYS

BACKGROUND OF THE INVENTION

1. Field of Invention

The present invention relates to the field of marine seismic data acquisition systems and methods of using same. More specifically, the invention relates to systems and methods for acquiring towed streamer seismic surveys in less time, or using fewer seismic resources, or increasing the fold using the same seismic resources.

2. Related Art

The performance of a marine seismic acquisition survey typically involves one or more vessels towing at least one seismic streamer through a body of water believed to overlie one or more hydrocarbon-bearing formations. WesternGeco L.L.C., Houston, Tex., currently conducts high-resolution Q-Marine™ surveys, in some instances covering many square kilometers. In many areas of the world hydrocarbon reservoirs located in structurally complex areas may not be adequately illuminated even with advanced towed marine streamer acquisition methods. For example, the shallow, structurally complex St. Joseph reservoir off Malaysia produces oil and gas in an area that poses many surveying and imaging challenges. Strong currents, numerous obstructions and infrastructure, combined with difficult near-surface conditions, may hinder conventional survey attempts to image faults, reservoir sands, salt domes, and other geologic features. A survey vessel known as a Q-Technology™ vessel may conduct seismic surveys towing multiple, 1000-10, 0000-meter cables with a separation of 25-50 meters, using the WesternGeco proprietary calibrated Q-Marine™ source. "Q" is the WesternGeco proprietary suite of advanced seismic technologies for enhanced reservoir location, description, and management. For additional information on Q-Marine™, a fully calibrated, point-receiver marine seismic acquisition and processing system, as well as Q-Land™ and Q-Seabed™, see http://www.westerngeco.com/q-technology.

To achieve high density surveys in regions having a combination of imaging and logistical challenges, a high trace density and closely spaced streamers may be used, however, this presents the potential of entangling and damaging streamer cables and associated equipment, unless streamer steering devices are closely monitored and controlled. While the Q suite of advanced technologies for marine seismic data acquisition and processing may provide detailed images desired for many reservoir management decisions, including the ability to acquire wide- and/or full azimuth data, the ability to acquire marine seismic data in less time and with less cost, or to increase the fold while also increasing the diversity of azimuth and offset, are constant goals of the marine seismic industry and would be viewed as advances in the art.

SUMMARY OF THE INVENTION

In accordance with the present invention, systems and methods are described for acquiring marine seismic data that may be more cost effective and provide improved seismic imaging in less time compared to presently employed systems and methods. While the systems and methods of the invention are particularly well-suited for collecting marine seismic data using one or more towed streamer cables, the systems and methods of the invention may also be useful when employing seabed seismic receiver cables.

A first aspect of the invention are methods of acquiring marine seismic data, one method comprising:
(a) deploying a marine seismic spread comprising one or more sources and a streamer tow vessel towing one or more marine seismic streamers comprising a plurality of acoustic receivers, and optionally a source;
(b) surveying a sub-sea geologic feature using the marine seismic spread, the spread smartly negotiating at least one turn during the surveying; and
(c) shooting at least one source and recording reflections using at least some of the receivers from the sub-sea geologic feature during the at least one turn.

A second method of the invention comprises:
(a) deploying a marine seismic spread comprising a plurality of source-only tow vessels each towing one or more marine seismic sources without streamers, and one or more source-streamer tow vessels each towing one or more marine seismic sources and one or more seismic streamers; and
(b) positioning the source-only tow vessels and the source-streamer tow vessels to acquire a wide- and/or full azimuth seismic survey without need for the spread to repeat a path once traversed.

Methods of the invention include those wherein there is more than one streamer in the spread, and the distance between streamers is substantially maintained by a plurality of streamer steering devices, such as those known under the trade designation Q-FIN, available from WesternGeco LLC, although the invention is not limited to this particular type of streamer steering device. Combinations of the methods of the methods may be practiced within the invention, wherein shooting and recording during at least one turn is performed along with positioning the source-only tow vessels and one or more source-streamer tow vessels to acquire a wide- and/or full azimuth seismic survey without the need for the spread to repeat a path once traversed. Methods of the invention include those wherein split-spread seismic data is acquired by acquiring seismic data simultaneously on one or more seismic source lines, including embodiments wherein the deploying of one or more source-streamer tow vessels comprises deploying a single source-streamer tow vessel, and methods including deploying one or more source-only tow vessels starboard of the streamers and one or more source-only tow vessels positioned port of the streamers, wherein the starboard and port distances are either the same or different. Certain other methods of the invention include deploying one or more starboard source-only tow vessels ahead of and starboard of the streamers, and one or more source-only tow vessel behind and starboard of the streamers, while deploying a similar arrangement on the port side. Certain methods of this embodiment of the invention may comprise deploying two or more streamer-source tow vessels each towing a plurality of streamers.

Other methods of the invention comprise collecting split-spread marine seismic data, comprising deploying a single source-streamer tow vessel towing a plurality of streamers, and deploying all of the source-only tow vessels on the starboard (or port) side of one or more source-streamer tow members to acquire wide- and/or full azimuth seismic survey data. Certain of these method embodiments may comprise deploying two or more source-only tow vessels port of (or starboard of) and positioned ahead of the streamers, and deploying two more source-only tow vessels port of (or starboard of) and positioned behind the streamers. A variation of these embodiments is deploying two or more sources utilizing the same source-only tow vessels.

Other methods of the invention comprise controlling the one or more source-only tow vessels and/or the one or more source-streamer tow vessels with one or more PI or PID controllers alone or in conjunction with other controllers. Certain methods of the invention may comprise towing one or more source-streamer tow vessels wherein the streamers are towed in configuration selected from side-by-side configuration, over/under configuration, "V" configuration, "W" configuration, or some other configuration.

Another aspect of the invention comprises systems, one system comprising:
(a) a marine seismic spread comprising one or more sources and a streamer tow vessel adapted to tow one or more marine seismic streamers comprising a plurality of acoustic receivers, and optionally a source;
(b) the spread adapted to survey a sub-sea geologic deposit using a linear swath and equipped to smartly negotiate at least one turn before or after the linear swath using the towed streamer marine seismic spread.

Another system of the invention comprises:
(a) a marine seismic spread comprising a plurality of source-only tow vessels each adapted to tow one or more marine seismic sources without streamers, and one or more source-streamer tow vessels each adapted to tow one or more marine seismic sources and one or more seismic streamers;
(b) the source-only tow vessels and the streamer-source tow vessel adapted to be positioned to acquire a wide- and/or full azimuth seismic survey without need for the spread to repeat a path once traversed.

Systems of the invention include those which maybe termed "split-spread" systems. These embodiments would comprise passive and/or active source deflecting members, such as source deflectors known in the art as MONOWING, available from WesternGeco L.L.C., and other source deflectors, such as door-type deflectors.

The simultaneous acquisition of split spread seismic data may be adapted to other marine seismic spread configurations known in the art, and all systems of the invention may be adapted to acquire marine seismic data during "linear" as well as during "curvilinear" surveys or portions of surveys (for example during turns). Systems of the invention for acquiring marine seismic data during curvilinear surveys or portions of surveys may comprise one or more receiver positioning apparatus or systems, source positioning apparatus or systems, one or more streamer steering devices, one or more source array steering devices, and/or noise attenuation apparatus or systems. Systems known as Q-Marine™ include these features and may be used in the systems and methods of the invention advantageously. Further, all systems of the invention may utilize sequential source shooting or, alternatively, two or more sources may be shot simultaneously, with the sources being encoded so that they may be distinguished during data interpretation. For the same nominal shot point interval, firing two or more sources simultaneously may reduce the shot time interval on each source line compared with sequential shooting.

Another system embodiment of the invention is that wherein the plurality of source-only tow vessels comprises two source-only tow vessels following substantially the same path or line, either port or starboard of a streamer-only tow vessel traveling substantially parallel to the path of the source-only tow vessels. This split-spread arrangement allows collection of a single source line.

Systems and methods of the invention may benefit from one or more controllers that control position of one or more tracking points. Tracking points may be anywhere in the marine seismic spread, for example but not limited to the center of a source, a streamer front end center, a streamer back end center, a tracking point somewhere between a center of source and a streamer front end center, a center of a plurality of streamers, a front of any one streamer, and the like. Tracking points may be dynamically or non-dynamically moved within a spread to optimize a given steering strategy, particularly during data acquisition during turns and other curvilinear paths. Controllers may be physically a part of the vessel steering sub-system or located separately from the steering sub-system, and may use some or all available information, including, but not limited to, source and vessel positions, vessel gyroscope reading, vessel compass reading, vessel speed log, streamer front end positions (if streamers are present), and historical, real-time, and future current and wind information and predictions when calculating the residual difference, and thus these may taken into consideration in the calculation of optimum vessel steering path by the vessel steering sub-system. The phrase "vessel steering sub-system" is defined herein and may differ among the various embodiments of the invention, as explained in the definition. Controllers may be selected from PI controllers, PID controllers (including any known or reasonably foreseeable variations of these), and compute a residual equal to a difference between a tracking point 3D coordinate position and a pre-plot track, optionally together with current and wind measurements, to produce a set point input to a vessel steering algorithm used by a vessel steering sub-system. Controllers may compute the residual continuously or non-continuously. Other possible implementations of the invention are those wherein one or more controllers comprise more specialized control strategies, such as strategies selected from feed forward, cascade control, internal feedback loops, model predictive control, neural networks, and Kalman filtering techniques. Systems and methods of the invention may be used during seismic data collection, including 3-D and 4-D seismic surveying.

Systems of the invention may include a seismic spread comprising one or more vessels such as towing vessels, chase vessels, work vessels, one or more a seismic sources, and optionally one or more seismic streamers towed by towing vessels. The streamers and sources may be separately towed or towed by the same vessel. If towed by separate vessels, two controllers may be employed and two residuals computed. In general, the controller may compute the residual based on what the position measurement system reports as the 3D coordinate position of the tracking point. Although there may be some degree of error in the reported 3D coordinate position due to a variety of error sources, including instrument measurement error, even with the errors the tracking point may be better controlled by steering the vessel the majority of the time.

Systems and methods of the invention may optionally be used in conjunction with other systems and methods. For example, if the centers of each of the sources are tracking points, their 3D coordinate positions may be determined from acoustic ranging networks, GPS, and other position sensors, and since the seismic team knows the paths each tracking point is supposed to follow based on the survey specifications, the controllers may use at least that information to calculate residuals, and a series of set points based on the residuals, for the steering algorithms of each vessel, either to steer the vessels back to the survey-specified paths, or ensure that the survey-specified paths are adhered to.

Systems and methods of the invention will become more apparent upon review of the brief description of the drawings, the detailed description, and the claims that follow.

BRIEF DESCRIPTION OF THE DRAWINGS

The manner in which the objectives of the invention and other desirable characteristics can be obtained is explained in the following description and attached drawings in which:

FIGS. 1-5 are plan or overhead schematic computerized renditions of five embodiments of systems and methods of the invention;

FIGS. 9-13 are schematic block diagrams illustrating a variety of control strategies useful in the present invention.

Figure 1:
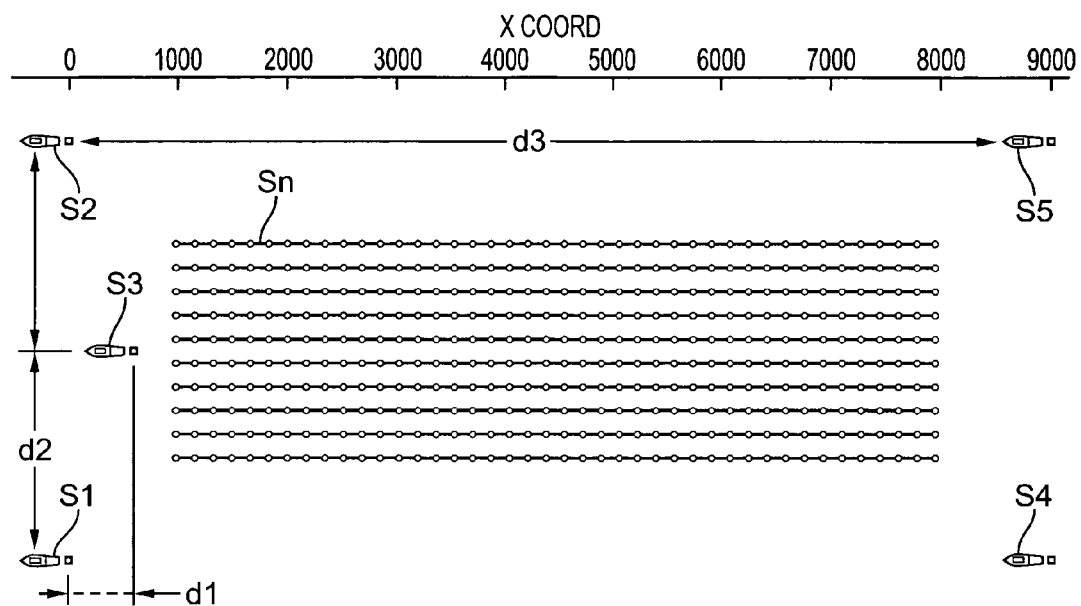

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, in the discussion herein, aspects of the invention are developed within the general context of acquiring marine seismic data in more time and cost efficient manner, which may employ computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced in whole or in part with other computer system configurations, including hand-held devices, personal digital assistants, multiprocessor systems, microprocessor-based or programmable electronics, network PCs, minicomputers, mainframe computers, and the like. In a distributed computer environment, program modules may be located in both local and remote memory storage devices. It is noted, however, that modification to the systems and methods described herein may well be made without deviating from the scope of the present invention. Moreover, those skilled in the art will appreciate, from the discussion to follow, that the principles of the invention may well be applied to other aspects of seismic data acquisition. Thus, the systems and method described below are but illustrative implementations of a broader inventive concept.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present invention relates to various systems and methods for efficiently acquiring marine seismic data, wherein efficiency may be defined as more cost effective and provide improved seismic imaging in less time compared to presently employed systems and methods. The systems and methods may be particularly adept at acquiring wide- and/or full azimuth marine seismic data, and acquiring such data during curvilinear paths, for example during spread turns.

As used herein the terms "smartly negotiate" and "smartly negotiating" mean that the streamers are steered through turns using controlled steering of streamer steering devices, and position of each seismic acoustic receiver is determined during the turns through acoustic networks, which may or may not be full streamer length acoustic networks. This ability to control the motion of the streamers and determine positions of the receivers during turns allows the marine seismic team to gather valuable reservoir and geologic data with increased efficiency. As used herein the term "turn" includes reversals, which is an art-recognized term used when a towed streamer marine seismic spread completes a first path or swath and makes a wide port or starboard curved path that is continued until the second path or swath has a heading 180° different than the first path or swath.

As used herein the phrase "wide- and/or full azimuth seismic survey" means acquiring marine seismic data through a range of (or all) angles that a direct line from a source to a receiver makes with true north.

The phrase "without the need for the spread to repeat a path once traversed" means that methods and systems of the invention do not require a marine seismic spread to repeat a particular path to obtain wide- and/or full azimuth seismic survey data. This may greatly save time, effort, and cost of obtaining wide and/or full azimuth marine seismic data records.

The term "spread" and the phrase "seismic spread" are used interchangeably herein and mean the total number of components, including vessels, vehicles, and towed objects including cables, sources and receivers, that are used together to conduct a marine seismic data acquisition survey.

The term "position", when used as a noun, is broader than "depth" or lateral (horizontal) movement alone, and is intended to be synonymous with "spatial relation." Thus "vertical position" includes depth, but also distance from the seabed or distance above or below a submerged or semi-submerged object, or an object having portions submerged. When used as a verb, "position" means cause to be in a desired place, state, or spatial relation. The term may also include orientation, such as rotational orientation, pitch, yaw, and the like.

FIGS. 1-5 are plan or overhead schematic computerized views of five embodiments of systems and methods of the invention. The embodiments represented schematically in FIGS. 1-4 allow split-spread seismic data to be acquired simultaneously on two seismic sources lines. One benefit of acquiring two source lines simultaneously is a reduction in the acquisition time by half. Other configurations may produce commensurate time savings. Referring to FIG. 1, source-only vessels S1 and S2 travel to the left in the schematic, as does source-streamer vessel S3, and source-only vessels S4 and S5. Source-only vessels S1 and S2 tow sources to the front-port and front-starboard, respectively, while source-only vessels S4 and S5 tow sources to the back-port and back-starboard, respectively. Source-only vessels S1 and S4 travel approximately the same port line, while source-only vessels S2 and S4 travel the same starboard line. Meanwhile, source-streamer vessel S3 tows a source as well as 10 streamer cables, designated as Sn. The number of streamer cables may vary as desired depending on the data to be gathered. Anywhere from 1 to 20 streamers are typical. In FIG. 1 the streamers are equal in length and at the same depth, but these are not necessary parameters for the invention. Streamers Sn are each shown to be about 7000 meters in this embodiment. The sources towed by source-only vessels S1 and S2 are separated in the y-coordinate, which is approximately perpendicular to the direction of travel of the spread, from the source towed by source-streamer vessel S3 by distances as indicated by arrow d2. The cross-line distances S1-S2 and S1-S3 may be the same or different. In this embodiment d2 is about 1500 meters port for S1, and about 1500 meters starboard for S2. Arrow d1 indicates a distance in the X-coordinate, or in-line direction of travel, between S1 and S3, as well as between S2 and S3, although these distances may be the same or different. In this example, d1 is about 500 meters. Distance d3 represents the distance in the X-coordinate between sources towed by source-only tow vessels S2 and S5, as well as between the sources towed by source-only tow vessels S1 and S3, although the distances S1-S4 and S2-S5 may be the same or different. Distance d3 may vary as required by any particular survey; in this embodiment distance d3 is about 9000 meters. Distance d4 (FIGS. 2 and 4) is at least one half of the width of the spread plus from about 50 to about 500 meters, and distance d5 (FIG. 4) is similar to distance d2 of FIG. 2.

FIG. 3 illustrates schematically a variation of the embodiment depicted in FIG. 1, the difference being that source-streamer vessel S3 in FIG. 1 has been split into two sources S3 and S3', with each of source-streamer vessels S3 and S3' towing five streamers.

In operation of the embodiments of FIGS. 1 and 3, as vessels S1, S2, S3, (S3' in FIG. 3), S4, and S5 travel forward (to the left in FIGS. 1 and 3), the sources may be fired either sequentially or in some other manner, and receivers in streamers Sn collect data. Since there are two source signaling lines (line S1-S4 and line S2-S5), as well as signals from S3, the sub-sea geologic formations between lines S1-S4 and S2-S5 may be collected without the need for the spread to traverse the same path twice.

Figure 2:
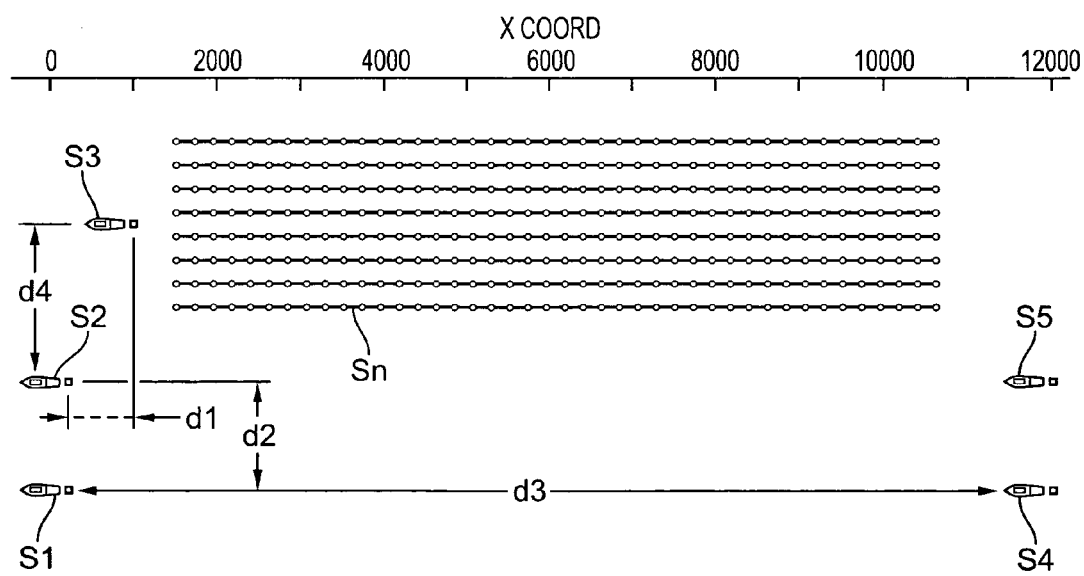
Figure 4:
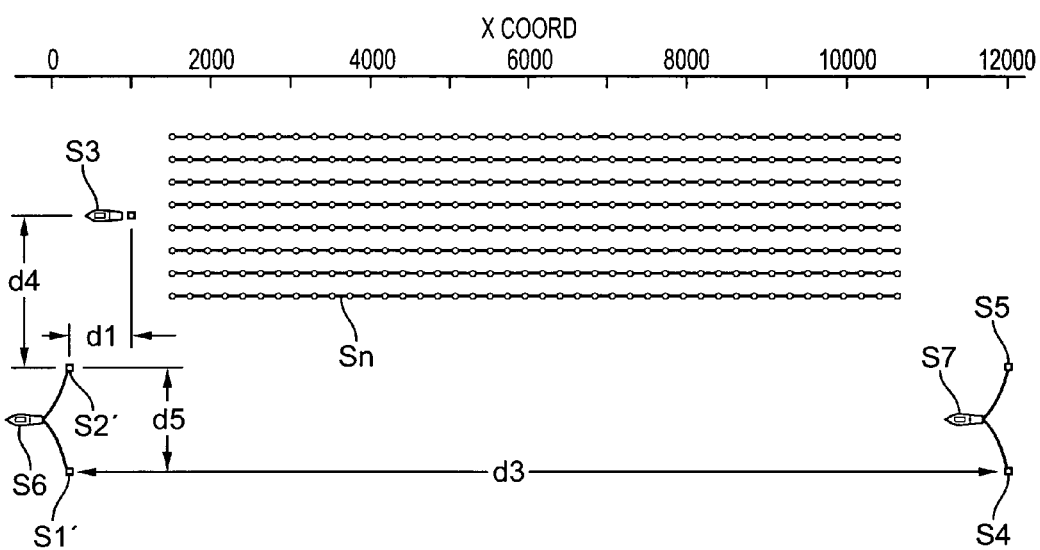

FIGS. 2 and 4 illustrate slightly different embodiments for reducing the time of acquisition of split-spread marine seismic data by half. The embodiment of FIG. 2 illustrates four sources-only tow vessels and their associated sources S1, S2, S4, and S5, while a source-streamer tow vessel and its associated source S3 also tows eight streamers Sn. In this representative embodiment, as well as the embodiment depicted in FIG. 4, all source-only tow vessels are on the port side of the streamers. They could just as well all be on the starboard side. Distance d1 represent a distance between sources associated with source-only tow vessel S1 and the source associated with source-streamer tow vessel S3. Distance d1 also represents the distance between the source associated with source-only tow vessel S2 and the source associated with source-streamer tow vessel S3. Distance d1 may vary as desired for any particular survey; in this embodiment distance d1 is about 1000 meters. Distance d2 represents the distance between sources associated with source-only tow vessels S1 and S2, as well as he distance between sources associated with source-only tow vessels S4 and S5. Distance d2 between S1 and S2 may be substantially equal to the distance d2 between S4 and S5, although exact identity is not required. Distance d2 may also vary as desired for any particular survey; in this embodiment distance d2 is about 1000 meters. Distance d3 represents the distance in the X-coordinate between sources towed by source-only tow vessels S1 and S4, as well as between the sources towed by source-only tow vessels S2 and S5, although the distances S1-S4 and S2-S5 may be the same or different. Distance d3 may vary as required by any particular survey; in this embodiment distance d3 is about 12000 meters, but could be 30000 m or more. Distance d4 represents the distance in the Y-coordinate between the source towed by source-only tow vessel S2 and the source associated with source-streamer vessel S3. Distance d4 may vary as required by any particular survey; in this embodiment distance d4 is about 2000 meters.

FIG. 4 illustrates a slightly different embodiment, wherein two source-only tow vessels S1 and S2 of FIG. 2 are replaced with one source-only tow vessel S6, configured to tow both sources S1' and S2'. Sources S1' and S2' may be deflected to port and starboard, respectively, using known deflectors.

In operation of the embodiments of FIGS. 2 and 4, as vessels S1, S2, S3, S4, S5 (and S6 in FIG. 4) travel forward (to the left in FIGS. 2 and 4), the sources may be fired either sequentially or in some other manner, and receivers in streamers Sn collect data. Since there are two source signaling lines (lines S1-S4 and S2-S5 in FIG. 2, and lines S1'-S4 and S2'-S5 in FIG. 4), as well as signals from S3, the sub-sea geologic formations between these lines may be collected without the need for the spread to traverse the same path twice.

Figure 5:
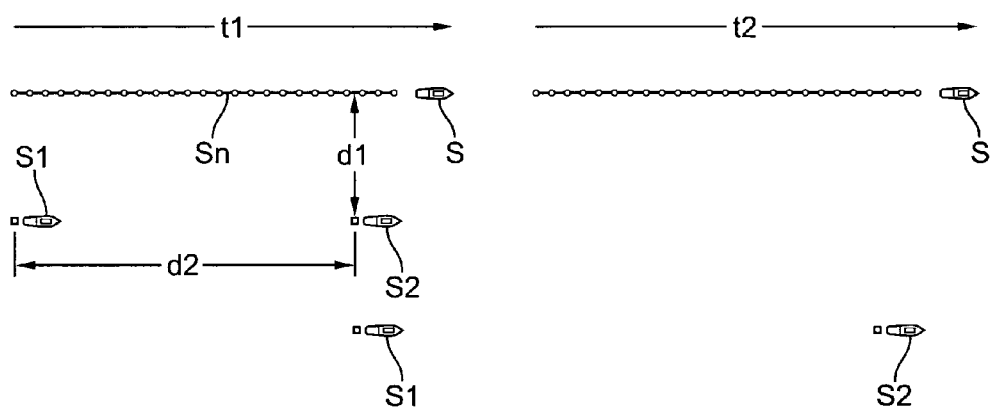

FIG. 5 is a simplified schematic representation of another system and method of the invention, illustrating a split-spread marine seismic data acquisition of a single source line between two sources associated with source-only tow vessels S1 and S2 using one streamer-only tow vessel S. Distance d1 represents the distance between source S1 and a center line of a group of streamers represented by Sn. Distance d2 represents the distance between sources associated with source-only tow vessels S1 and S2. Two different times are represented, time t1 and time t2. In operation, as streamer-only vessel S, and source-only vessels S1 and S2 travel forward with the same speed (to the right), at time t1, sources associated with source-only vessels S1 and S2 may fire simultaneously, acquiring a seismic data line. At time t2, the sources may again fire simultaneously. Alternatively, the source associated with source-only vessel S1 may fire at time t1 while the source associated with source-only vessel S2 remains idle at time t1, while the source associated with source-only vessel S2 fires at time t2 and the source associated with source-only vessel S1 remains idle. Each shot point fired by the source S2 will be re-occupied by the source S1 and in this way a split-spread will be generated: for shot S2 the spread is behind the source point and for source S1, when S1 will be at the same location with S2, the spread will be in front of the source point. Either firing arrangement allows collection of data from a single line without the spread having to traverse the same path again, as might be required with standard spreads.

Figure 6:
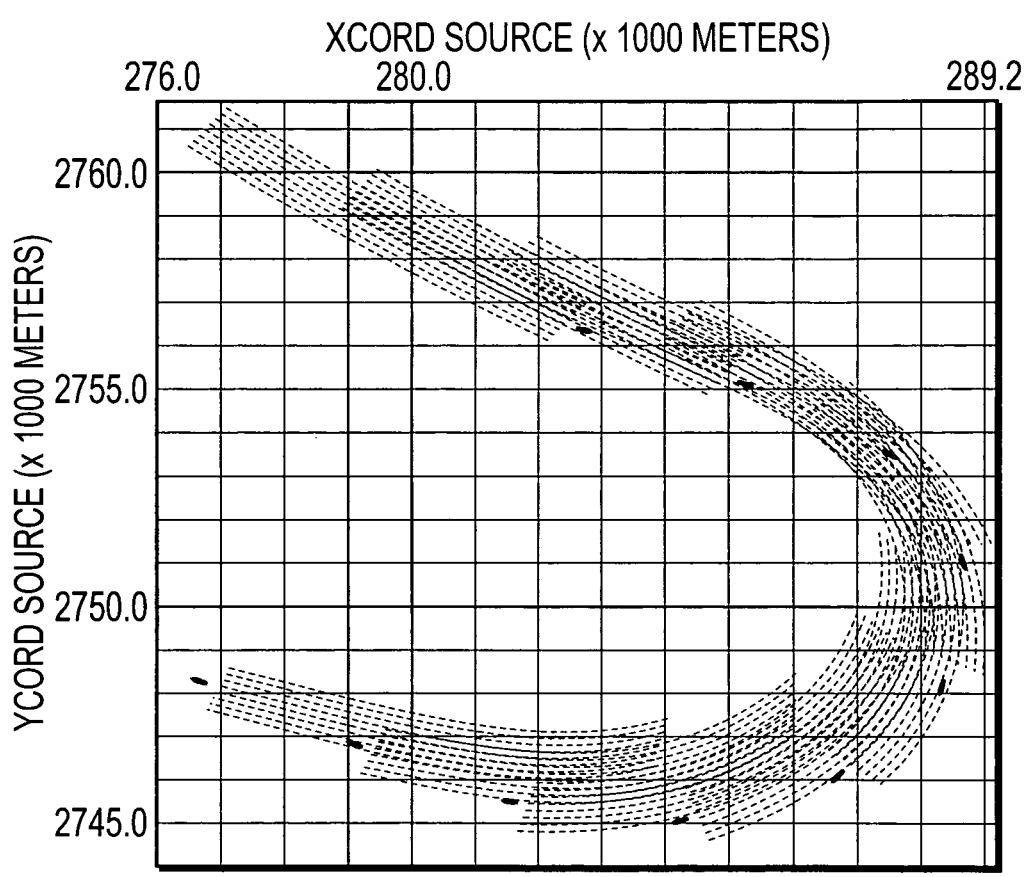
FIG. 6 is a computerized rendition of a plan view of one embodiment of the invention during a turning maneuver.

FIG. 6 is a time-lapsed computerized plan view of one system and method embodiment of the invention during a turning maneuver. In the embodiment illustrated, which comprises a source-streamer tow vessel pulling eight streamers, the distance between vertical dotted lines is 1000 meters, while the distance between horizontal dashed lines is also 1000 meters. Thus the turn for this embodiment occurred over an area of about 17000 meters (Y-coordinate) by 12000 meters (X-coordinate). Wide-azimuth and/or full-azimuth data may be collected during such a curvilinear path using, for example, one of the embodiments illustrated in FIGS. 1-4, along with spread control devices as described herein, and with the fully calibrated sources known as Q-Marine™, from WesternGeco L.L.C., Houston, Tex. The ability to collect wide-angle and/or full-angle azimuth marine seismic data during turns or other curvilinear paths greatly reduces the time and cost of obtaining this marine seismic data.

Figure 7:
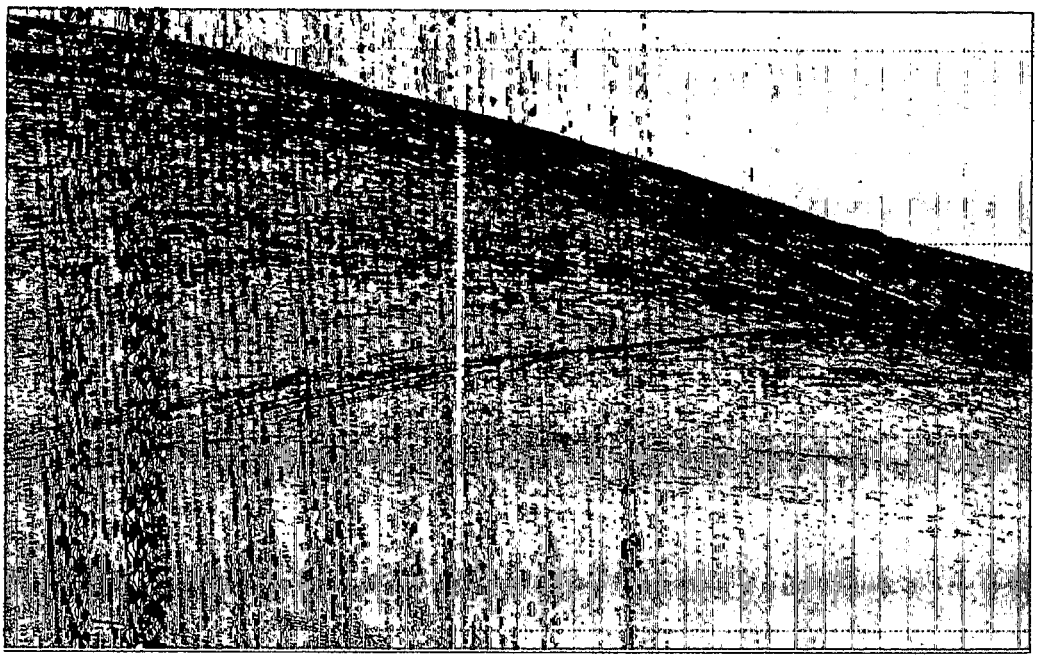
FIGS. 7-8 compare raw data acquired during the turn (FIG. 7) with the data after noise attenuation (FIG. 8)
Figure 8:
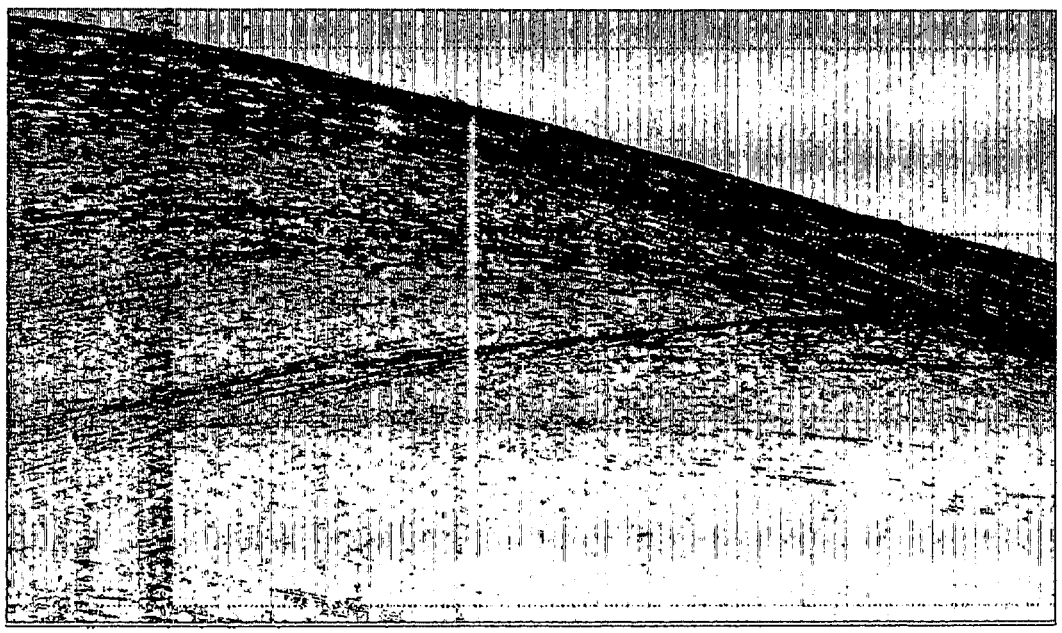

FIGS. 7-8 compare raw data acquired during the turn (FIG. 7) with the data after noise attenuation using the Q-marine single sensor processing (FIG. 8). Data acquired during the turns with standard marine systems is quite noisy due to the marine current flow along the non-steered streamers. Streamer steering reduces noise due to marine current. The recording of single sensor data makes possible to attenuate the turning noise efficiently (FIG. 8 vs. FIG. 7). Furthermore, conventional systems cannot estimate position of the receivers accurately enough during the turns; this is possible with the methods and systems of the invention.

FIGS. 9-13 are schematic block diagrams of five non-limiting systems and methods for controlling positions of one or more track points TP using vessel steering, which may be useful in efficiently collecting towed streamer marine seismic data in accordance with the invention. These control strategies may be used for gross steering of sources and/or streamers towed by one or more vessels, while spread control elements such as steerable birds and source steering devices may be used for finer steering.

In the discussion that follows, the phrase "center of source", sometimes referred to herein as CS, means the 3D coordinate position of the center of a plurality of air-guns or other acoustic devices designed to produce acoustic signals, or "shots," which are directed down through the water into the earth beneath, where they are reflected from the various strata.

The phrase "streamer front end center", sometimes referred to herein as SFC, means the 3D coordinate position of a plurality of streamer front ends determined from the individual 3D coordinate positions of each streamer front end, that is, the streamer ends closest to the towing vessel.

The term "control", used as a transitive verb, means to verify or regulate by comparing with a standard or desired value. Control may be closed loop, feedback, feed-forward, cascade, model predictive, adaptive, heuristic and combinations thereof.

The term "controller" means a device at least capable of accepting input from sensors and meters in real time or near-real time, and sending commands directly to a vessel steering sub-system, and optionally to spread control elements, and/or to local devices associated with spread control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features, as further explained herein. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered useful in practicing the methods and systems of the invention.

The phrase "spread control element" means a spread component that is controllable and is capable of causing a spread component to change coordinates, either vertically, horizontally, or both, and may or may not be remotely controlled.

The terms "control position", "position controllable", "remotely controlling position" and "steering" are generally used interchangeably herein, although it will be recognized by those of skill in the art that "steering" usually refers to following a defined path, while "control position", "position controllable", and "remotely controlling position" could mean steering, but also could mean merely maintaining position. In the context of the following discussion, "control position" means we use at least the tracking point position and compare it to a pre-plot path in order to give steering commands to vessel steering elements.

"Real-time" means dataflow that occurs without any delay added beyond the minimum required for generation of the dataflow components. It implies that there is no major gap between the storage of information in the dataflow and the retrieval of that information. There may be a further requirement that the dataflow components are generated sufficiently rapidly to allow control decisions using them to be made sufficiently early to be effective. "Sear-real-time" means dataflow that has been delayed in some way, such as to allow the calculation of results using symmetrical filters. Typically, decisions made with this type of dataflow are for the enhancement of real-time decisions. Both real-time and near-real-time dataflows are used immediately after the next process in the decision line receives them.

The phrase "vessel steering sub-system" means any device or collection of components that are capable of generating commands to vessel steering elements, such as rudders, thrusters, and the like, to accomplish the intended movements of the seismic towing vessel. In some embodiments the vessel steering sub-system may include a vessel tracking computer and/or an autopilot. In other embodiments a vessel steering sub-system may bypass conventional tracking and autopilot functions, and may be simply a vessel rudder controller, and/or a vessel thruster controller (these embodiments may be referred to as "steering the vessel directly" using the controller). In yet other embodiments, all of these components (tracking computer, autopilot, rudder controller, and thruster controllers) may be employed.

Figure 9:
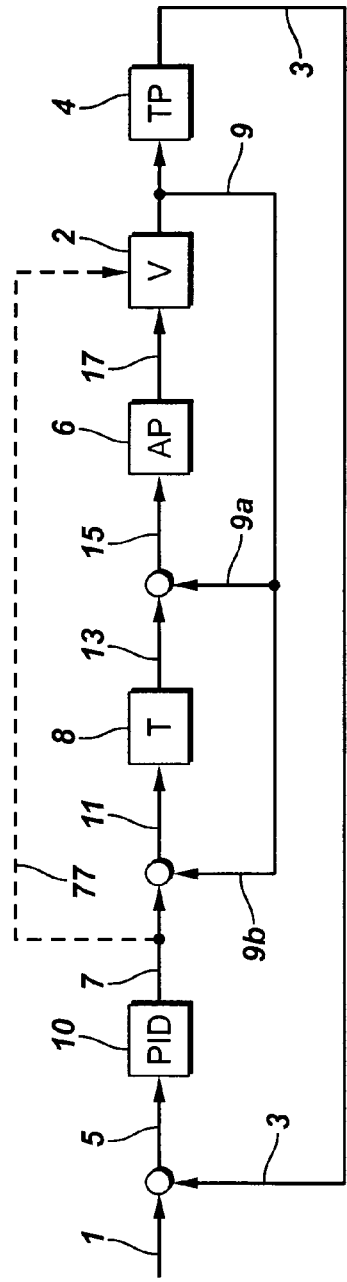

Referring now to FIGS. 9-13, note that the same numerals are used throughout FIGS. 9-13 to designate same components unless otherwise mentioned. FIG. 9 illustrates a simple PID feedback loop. The main components include the vessel 2, a tracking point 4, in a block labeled TP which may be an imaginary point anywhere in the spread, such as between the center of a source and a streamer front end center, or may be the center of a source itself. Also illustrated are blocks 6 for an autopilot AP, a block 8 designating a tracking control device T, and PID controller 10. PID controller 10 compares a set point pre-plot position 1 of tracking point 4 with a measured 3D coordinate position 3 of tracking point 4, and calculates a difference, referred to herein as a residual or residual difference, 5, and generates a command 7 as a set point track to tracking control device 8. It will be understood that certain embodiments will send command 7 directly to the autopilot, bypassing the tracking device, or bypass both the tracking device and autopilot, and directly command the vessel rudder and/or vessel thruster, as indicated by the dashed line 77. In one embodiment of FIG. 9, tracking control device 8 compares this new set point track 7 to a measured track 9b of vessel 2 and computes a difference 11, and uses difference 11 in generating a set point heading 13 for use by autopilot 6. Autopilot 6 compares set point heading 13 with a measured heading 9a of vessel 2, computes a difference as 15, and uses difference 15 to generate a steering set point 17 for vessel 2, which is transmitted to a vessel rudder and/or thruster. Steering of vessel 2 will then influence the tracking point 4 position in a more controlled and stable fashion using a tuned controller, rather than a human operator. In one alternative embodiment, indicated by dashed line 77, steering set point 17 is replaced directly by set point indicated by dashed line 77.

Figure 10:
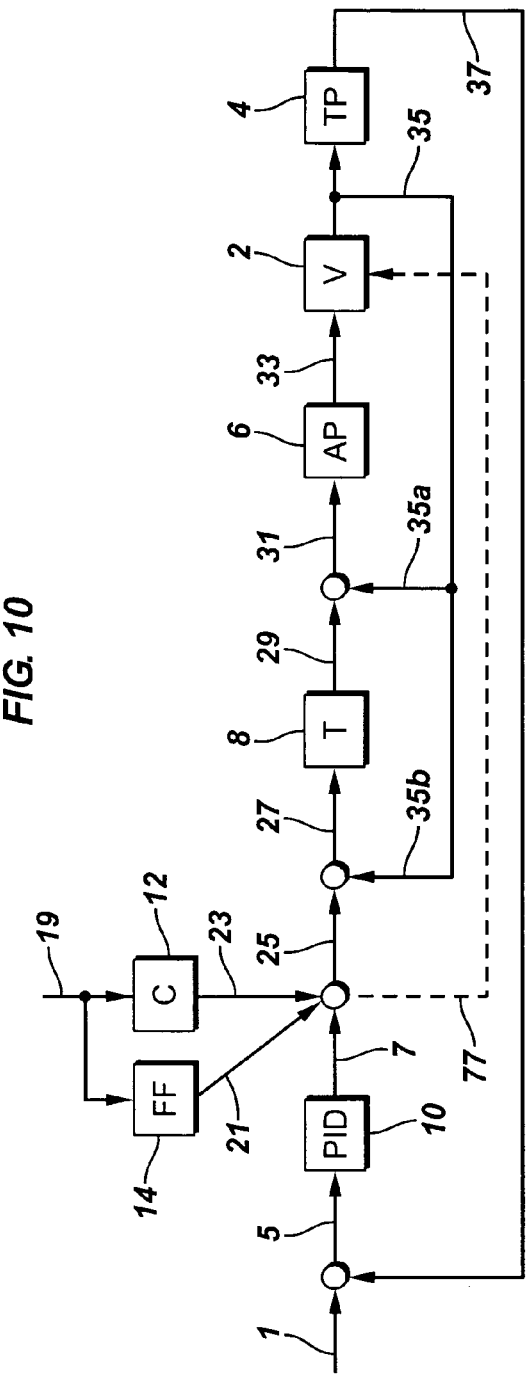

FIG. 10 illustrates a schematic block diagram of another system and method useful in the invention for controlling position of a track point TP using vessel steering. Components 2, 4, 6, 8, and 10 are the same as in FIG. 9. PID controller 10 compares a pre-plot position 1 of tracking point 4 with a measured 3D coordinate position 37 of tracking point 4, and calculates a difference, referred to herein as a residual or residual difference, 5, and generates a command 7 as a set point track to tracking control device 8. Added in this embodiment is a modification of the set point signal 7 by a feed-forward controller 12 in block C, which may optionally feed historical, real time or near-real time, or future predictions of data 19 regarding current and/or wind as a modification to set point 7. Also depicted is a block denoted FF, which may optionally feed forward historical information 19 regarding wind, current, and other environmental conditions, or information regarding obstructions in the designated survey area, and the like. In one embodiment of FIG. 3, a modified set point track 25 is compared with a measured track 35b of vessel 2 and computes a difference 27, and uses difference 27 in generating a set point heading 29 for use by autopilot 6. Autopilot 6 compares set point heading 29 with a measured heading 35a of vessel 2, computes a difference as 31, and uses difference 31 to generate a steering set point 33 for vessel 2. Alternatively, rather than comparing set point 25 with measured track 35b, set point 77 is sent directly to vessel 2 for changing a vessel rudder, thruster, or both. In either embodiment of FIG. 10, steering of vessel 2 will then influence the tracking point 4 position in a more controlled and stable fashion using a tuned PID controller and feed-forward controller, rather than a PID controller alone, or a human operator.

Figure 11:
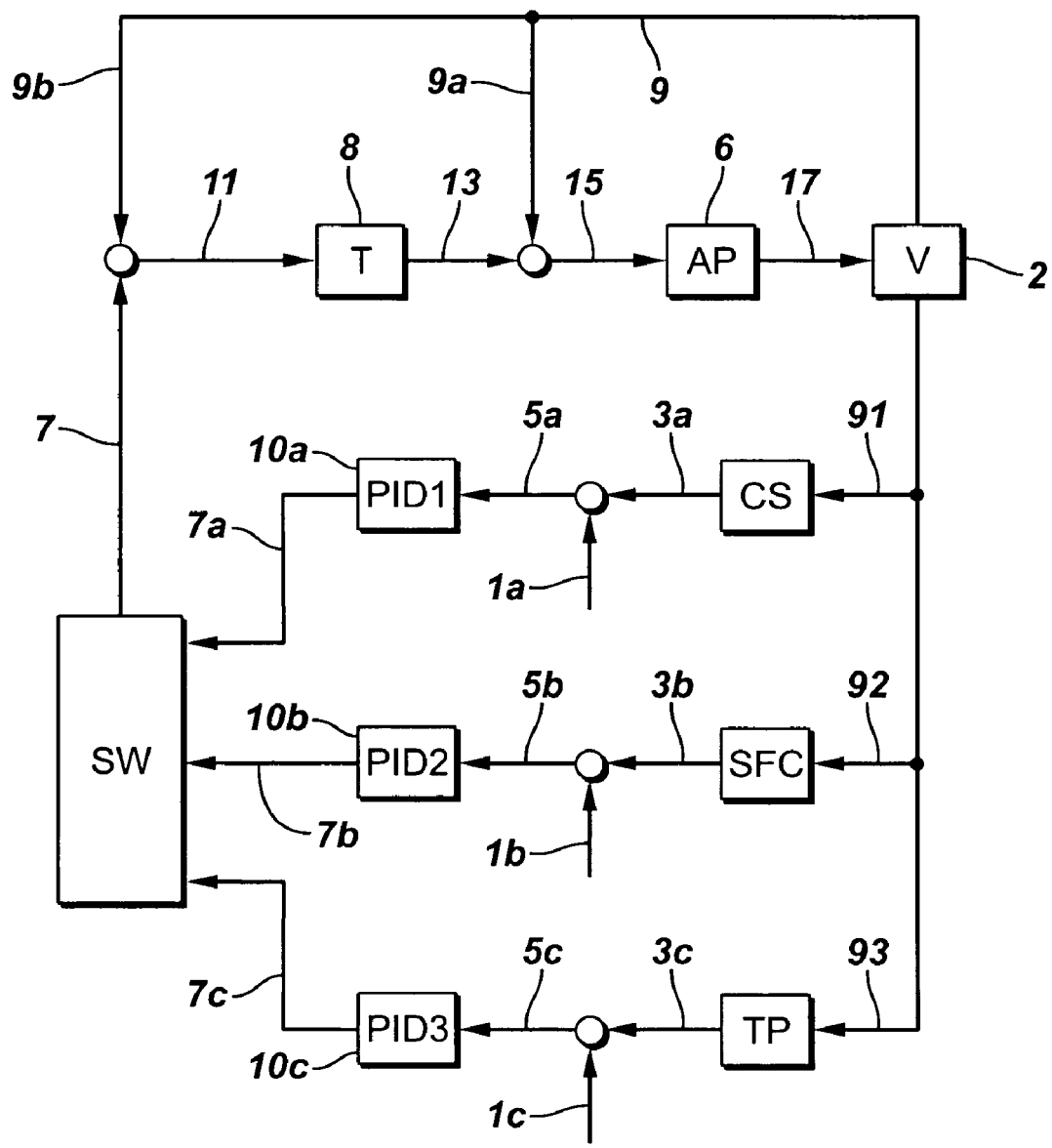

FIG. 11 illustrates another system and method useful in the invention in schematic block diagram fashion. The system and method illustrated in FIG. 11 is similar to that illustrated in FIG. 9, but includes certain features not present in the embodiment illustrated in FIG. 9. Rather than a single tracking point and a single pre-plot tracking point, the embodiment of FIG. 11 includes three pre-plot track set points 1a, 1b, and 1c. Pre-plot set point 1a may be for a center of source, CS; pre-plot set point 1b may be for a streamer front end center, SFC; and pre-plot set point 1c may be for an imaginary tracking point, TP. Other pre-plot set points may be used. Also included in this embodiment are three PID controllers 10a, 10b, and 10c, one each for calculating respective residual differences 5a, 5b, and 5c between respective set points 1a, 1b, and 1c and 3D coordinate position measurements 3a, 3b, and 3c for CS, SFC, and TP, and generating preliminary command set points 7a, 7b, and 7c, respectively. A switch SW, which may be automatically programmed, or periodically switched by a human operator, selects which preliminary command set point to use as the set point 7 for tracking control device 8. As an example, switch SW might be programmed to compare preliminary set points 7a, 7b, and 7c to select the largest of the residuals to use. Although the expense of this system may be greater than the embodiment illustrated in FIG. 9 due to the provision of three PID (or other type) controllers and a switching device, the ability to use the greatest residual, or some other residual, may provide higher quality control. Mono-variable or multivariable model predictive controllers could substitute for one or more of the PID controllers in these embodiments.

FIGS. 12 and 13 illustrate use of Model Predictive (MP) controllers rather than PID controllers. The characteristics of each are discussed herein below. The embodiments illustrated in FIG. 12 are similar to those discussed in relation to FIG. 9 except for the use of MP controllers, which may be mono-variable or multivariable MP controllers. The main components include the vessel 2, a tracking point 4, in a block labeled TP which may be an imaginary point anywhere in the spread, such as between the center of source and streamer front end center, or may be the center of source itself. Also illustrated are blocks 6 for an autopilot AP, a block 8 designating a tracking control device T, and MP controller 10. MP controller 10 compares a set point pre-plot position 1 of tracking point 4 with a measured 3D coordinate position 3 of tracking point 4, and uses a pre-existing mathematical model of the system in conjunction with measured disturbances 191 on the system, such as wind, currents, and the like, and calculates a residual and generates a command 7 as a set point track to tracking control device 8. As with the embodiments described in reference to FIG. 9, it will be understood that certain embodiments will send command 7 directly to the autopilot, bypassing the tracking device, or bypass both the tracking device and autopilot, and directly command the vessel rudder and/or vessel thruster, as indicated by the dashed line 77. In one embodiment of FIG. 12, tracking control device 8 compares this new set point track 7 to a measured track 9b of vessel 2 and computes a difference 11, and uses difference 11 in generating a set point heading 13 for use by autopilot 6. Autopilot 6 compares set point heading 13 with a measured heading 9a of vessel 2, computes a difference as 15, and uses difference 15 to generate a steering set point 17 for vessel 2, which is transmitted to a vessel rudder and/or thruster. Steering of vessel 2 will then influence the tracking point 4 position in a more controlled and stable fashion using a tuned controller, rather than a human operator. In one alternative embodiment, indicated by dashed line 77, steering set point 17 is replaced directly by set point indicated by dashed line 77.

The embodiments illustrated in FIG. 13 are similar to those discussed in relation to FIG. 10 except for the use of MP controllers, which may be mono-variable or multivariable MP controllers. MP controller 10 compares a pre-plot position 1 of tracking point 4 with a measured 3D coordinate position 37 of tracking point 4, and calculates a residual 5, and generates a command 7 as a set point track to tracking control device 8. Added in this embodiment is a modification of the set point signal 7 by a feed-forward controller 12 in block C, which may optionally feed historical, real time or near-real time, or future predictions of data 19 regarding current and/or wind as a modification to set point 7. Also depicted is a block denoted FF, which may optionally feed forward historical information 19 regarding wind, current, and other environmental conditions, or information regarding obstructions in the designated survey area, and the like. In one embodiment of FIG. 13, a modified set point track 25 is compared with a measured track 35b of vessel 2 and computes a difference 27, and uses difference 27 in generating a set point heading 29 for use by autopilot 6. Autopilot 6 compares set point heading 29 with a measured heading 35a of vessel 2, computes a difference as 31, and uses difference 31 to generate a steering set point 33 for vessel 2. Alternatively, rather than comparing set point 25 with measured track 35b, set point 77 is sent directly to vessel 2 for changing a vessel rudder, thruster, or both. In either embodiment of FIG. 13, steering of vessel 2 will then influence the tracking point 4 position in a more controlled and stable fashion using an MP controller and feed-forward controller, rather than an MP controller alone, or a human operator.

The apparatus and methods illustrated in FIGS. 9-13, or other systems and methods, may be used in conjunction with conventional spread control devices. These devices include source steering devices and streamer steering devices. Such devices are often part of the spread and towed by the vessel.

For example, a source reference point generally must be within 10 meters cross line of the target in order for a source steering device with an ability to move the source 10 meters crossline to move the source reference closer to the target.

Controllers useful in the systems and methods of the invention may vary in their details. One PID controller useful in the invention may be expressed mathematically as in Equation 1:

$$u(t)=K_p[e(t)+1/T_i\cdot\int e(t)dt+T_d\cdot\dot{e}(t)] \quad (1)$$

wherein:
∫ means integrate;
$\dot{e}(t)$ means the time derivative;
u(t) is controller output, either meters across to a tracking control device such as that known under the trade designation Robtrack/STS500, or heading to an autopilot;
e(t) means difference between wanted (planned, reference) and measured (current position, y) value;
$T_d$ is a constant for describing the derivative part of the algorithm (the derivative part may be filtered to avoid deriving high frequencies);
$T_i$ is a constant for describing the integrating part of the algorithm; and
$K_p$ is a proportional gain constant.

In the s-plane (Laplace), the PID controller may be expressed as (Equation 2):

$$H_r(S)=K_p[1+1/T_is+T_ds/(1+T_fs)] \quad (2)$$

wherein:
s is the variable in the s-plane; and
$T_f$ is a constant describing the filtering part of the derivative part of the algorithm.

For discretization, a variety of transforms may be employed, and some constants may or may not be useful. For example, the $T_f$ constant may not be necessary in some instances, but may be especially useful in other scenarios. As one discretization example, the z-transform may be used, meaning that the integral part of the algorithm may be approximated by using a trapezoid model of the form (Equation 3):

$$s=(1-z_{-1})/T \quad (3)$$

while the derivative part may be approximated using an Euler model (Equation 4):

$$s=2/T\cdot(1-z_{-1})/(1+z_{-1}) \quad (4)$$

wherein T is the sampling time.

The resulting discrete model may then be used directly in the steering algorithm. Other discrete models, derived using other transforms, are useful in the invention, and will be apparent to control technicians or control engineers of ordinary skill.

Model Predictive Control (MPC) is an advanced multivariable control method for use in multiple input/multiple output (MIMO) systems. An overview of industrial Model Predictive Control can be found at: www.che.utexas.edu/~qin/cpcv/cpcv14.html. MPC computes a sequence of manipulated variable adjustments in order to optimise the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2 . . . . MPC may use any derived objective function, such as Quadratic Performance Objective, and the like, including weighting functions of manipulated variables and measurements. Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like. It may be difficult to explicitly state stability of an MPC control scheme, and in certain embodiments of the present invention it may be necessary to use nonlinear MPC. In so-called advance spread control of marine seismic spreads, PIED control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

Feed forward algorithms, if used, will in the most general sense be task specific, meaning that they will be specially designed to the task they are designed to solve. This specific design might be difficult to design, but a lot is gained by using a more general algorithm, such as a first or second order filter with a given gain and time constants.

The introduction of a tracking point may serve at least two purposes:
1. It gives a more flexible solution for a track that we want parts of the spread to follow;
2. If other means are used for controlling source positions, like a winch or a source deflector, the vessel will in many occasions have "spare" steering capacity available. This may mean that by moving the tracking point aft of the sources, streamer front ends and consequentially also the receivers may be closer to where they should be, which may help the streamer steering devices, such as those known under the trade designation Q-FIN, available from WesternGeco, L.L.C., Houston, Tex., in achieving their steering objectives.

In certain embodiments, a tracking point will not be a static point in the spread, as time varying currents may result in the center of source steering objective and the tracking point steering objective unable to be met at the same time. In these embodiments, the tracking point may be moved, either dynamically or non-dynamically, until both objectives can be met with a certain slack. The reverse might also be the case, i.e. having excess steering power resulting in moving the tracking point further aft. If the movement of the tracking point is above a predefined distance, a new set of parameters for both the controller and the feed forward controller may be used to optimize the controller performance.

Figure 14:
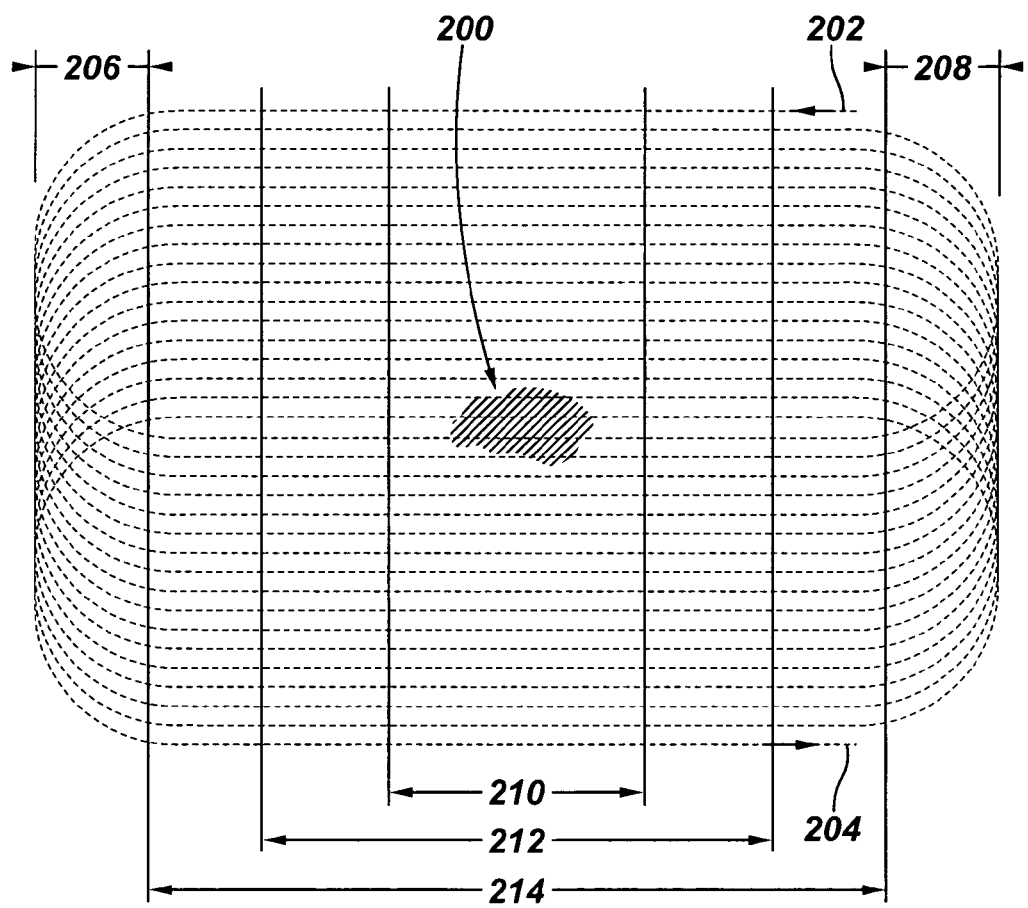
FIG. 14 is a schematic plan view of one method of the invention for acquiring towed streamer marine seismic survey data, discussing how shooting and recording acoustic seismic data during spread turns may increase efficiency of towed streamer marine seismic data acquisition methods.

The control systems and methods illustrated in FIGS. 9-13 may be used in the spread embodiments of FIGS. 1-6, the methods discussed in reference to FIG. 14, as well as other spread configurations. For example, for obtaining deghosted seismic data, it may be possible to provide one or more seismic streamers with a companion seismic streamer where the companions are towed in over/under fashion. The vertical distance between seismic streamers in an over/under seismic streamer pair may range from 1 meter to 50 meters, and may be about 5 meters. A selected number of hydrophones, either mounted within the seismic streamer or in/on equipment mounted onto the seismic streamer, may be used as receivers in an acoustic ranging system and thereby provide knowledge of the horizontal and vertical position of seismic streamers.

In use, control systems and methods such as those illustrated in FIGS. 9-13 are particularly adept for 3D and so-called 4D marine seismic data acquisition surveys, for collection of wide- and/or full azimuth data, for shooting and recording towed streamer marine seismic data during turns, and may be used in positioning seabed seismic cables as well. More specifically, the systems and methods of FIGS. 9-13 may be integrated into the seismic towing vessel steering strategy, and may be integrated into positioning strategies for the other spread elements.

FIG. 14 is a schematic plan view of one method of the invention for acquiring towed streamer marine seismic survey data, discussing how shooting and recording acoustic seismic data during spread turns may increase efficiency of towed streamer marine seismic data acquisition methods. FIG. 14 illustrates a hydrocarbon deposit or other sub-sea geologic feature 200 of interest. Illustrated in FIG. 14 in plan view schematically is the path of a towed streamer marine seismic spread. The spread may be a single source-streamer vessel towing any number of streamers and seismic sources. Single- and dual-sources are common. Alternatively any of the spreads discussed herein may be used. The spread might comprise, for example, three vessels, one of which is a source-streamer vessel, and the other two being source-only vessels, the source-streamer vessel towing a dual source, and towing 8 streamers each 8 km long, separated by 140 m, the source-only vessels each towing a single source. The spread moves from right to left (which may, for example, be east to west, or 90° azimuth, although this is arbitrary) beginning at 202, sails west past the geologic feature 200, then performs a looping 180° turn in turn area 206 and begins traveling left to right (east), sails over the geologic feature, until finally performing another 180° turn in turn area 208 and coming very close to, but not exactly to the beginning point 202, wherein another sailing cycle is performed, the next sailing cycle moving just to the south of the previous sailing cycle, until the spread reaches point 204, the finish of the seismic survey. A survey area consists in an image area, 210, plus the area required to properly image the data (migration aperture), 212, plus the area required to generate full fold data (fold taper), 214. The fold coverage in the area of fold taper 214 is continually decreasing toward the edges of the survey, particularly in the turn areas 206 and 208. By shooting during turns 206 and 208, the fold coverage is maintained the same. One advantage of shooting continuously during the turns is that the image area 210 is increased and the extent of the whole survey is increased by adding area covered during turns. In this way, within the same acquisition time frame, a larger survey area is acquired with no additional acquisition time. The acquisition during the turns is very beneficial for wide azimuth acquisition, which may require combinations of rectilinear and curvilinear boat paths, as depicted in FIG. 14. Other combinations of rectilinear and curvilinear vessel paths are considered within the invention.

In order to acquire towed streamer marine seismic data during turns, the position of acoustic receivers, streamer steering, and noise attenuation are key factors. The source-streamer vessel and streamers may be part of a system known under the trade designation Q-Marine™, from WesternGeco. In these systems, streamers may be equipped with acoustic transmitters and point receivers for accurate position determination, employing intrinsic ranging modulated acoustics, as taught in U.S. Pat. No. 5,668,775, incorporated by reference herein in its entirety. As taught in the 775 patent, the streamer transmitters and point receivers may form a full-streamer-length acoustic network, wherein a unique spread spectrum code of acoustic frequencies are emitted by each of a plurality of acoustic transmitters placed within the streamers, all frequencies being within the seismic frequencies detected by the same receivers during shooting and recording, and the point receivers within the streamers are able to distinguish each transmitter's unique code. Thus, accurate positioning of seismic receivers is possible. Conventional streamers use arrays of hydrophones, such as 12 or 18 hydrophones per group, which are summed together in analog fashion and than recorded. Systems known as Q-Marine™ use single sensors or point receivers: these are placed in the streamer at intervals, for example one every 3 to 4 m, and recorded. All point receivers route data to a computer, where digital filters are applied taking advantage of the very fine sampling of the receivers for very powerful coherent noise attenuation of line swell noise and/or streamer cable noise. During the turns the noise from marine current may be stronger, since at least portions of the streamers may be traveling cross-current. This is one reason shooting during turns is not possible with conventional streamers. With systems known as Q-Marine™, noise can be attenuated from each point receiver very well. Furthermore, streamers may be steered into desired positions by steering devices, as further described herein.

Shooting and recording in the turns is made possible through the combination of steering of streamers and acoustic positioning networks, and optionally noise attenuation if necessary through digital filtering signals from point receivers in the streamers. Furthermore, the ability to acquire towed streamer marine seismic data during curved paths, turns, and the like increases efficiency since more data is obtained during the same survey time. Alternatively, less time is required to obtain the same amount of towed streamer seismic data. Less operating time translates into fuel and other operating savings for source-streamer vessels, as well as source-only vessels.

Systems and methods of the invention may employ any number of spread control elements, which may include one or more orientation members, a device capable of movements that may result in any one or multiple straight line or curved path movements of a spread element in 3-dimensions, such as lateral, vertical up, vertical down, horizontal, and combinations thereof. The terms and phrases "bird", "cable controller", "streamer control device", and like terms and phrases are used interchangeably herein and refer to orientation members having one or more control surfaces attached thereto or a part thereof. A "steerable front-end deflector" (or simply "deflector") such as typically positioned at the front end of selected streamers, and other deflecting members, such as those that may be employed at the front end of seismic sources or source arrays, may function as orientation members in some embodiments, although they are primarily used to pull streamers and steer sources laterally with respect to direction of movement of a tow vessel. Horizontal separation between individual streamers may range from 10 to about 200 meters. In the embodiments of FIGS. 1-4 the horizontal streamer separation may be consistent between one streamer and its nearest neighboring streamers. Horizontal and/or vertical control of streamers may be provided by orientation members (not illustrated) which may be of any type as explained herein, such as small hydrofoils or steerable birds that can provide forces in the vertical and/or horizontal planes. One suitable orientation member is the device known under the trade designation Q-FIN™, available from WesternGeco L.L.C., Houston, Tex., and described in U.S. Pat. No. 6,671,223, describing a steerable bird that is designed to be electrically and mechanically connected in series with a streamer; another suitable device is that known under the trade designation Digi-BIRD™, available from Input/Output, Inc., Stafford, Tex. Other streamer positioning devices, such as the devices described in U.S. Pat. Nos. 3,774,570; 3,560,912; 5,443,027; 3,605,674; 4,404,664; 6,525,992 and EP patent publication no. EP 0613025, may be employed.

Systems of the invention may communicate with the outside world, for example another vessel or vehicle, a satellite, a hand-held device, a land-based device, and the like. The way this may be accomplished varies in accordance with the amount of energy the system requires and the amount of energy the system is able to store locally in terms of batteries, fuel cells, and the like. Batteries, fuel cells, and the like may be employed, and wireless communication may be sufficient. Alternatively, or in addition, there may be a hard-wire power connection and a hard wire communications connection to another device, this other device able to communicate via wireless transmission.

Certain systems and methods of the invention may work in feed-forwarded fashion with existing control apparatus and methods to position not only the tow vessels, but seismic sources and streamers. Sources and streamers may be actively controlled by using GPS data or other position detector sensing the position of the streamer (e.g. underwater acoustic network), or other means may sense the orientation of one or more individual streamers (e.g. compass) and feed this data to navigation and control systems. While gross positioning and local movement of one or more tracking points, centers of sources and/or a streamer front end center may be controlled via controlling one or more tow vessels, fine control may be accomplished on some other vessel, locally, or indeed a remote location. By using a communication system, either hardwire or wireless, environmental information ahead of the vessel may be sent to one or more local controllers, as well as the controller for each vessel. The local controllers may in turn be operatively connected to spread control elements comprising motors or other motive power means, and actuators and couplers connected to the orientation members (flaps), and, if present, steerable birds, which function to move the spread components as desired. This in turn adjusts the position of the spread element, causing it to move as desired. Feedback control may be achieved using local sensors positioned as appropriate depending on the specific embodiment used, which may inform the local and remote controllers of the position of one or more orientation members, distance between streamers, a position of an actuator, the status of a motor or hydraulic cylinder, the status of a steerable bird, and the like. A computer or human operator can thus access information and control the entire positioning effort, and thus obtain much better control over the seismic data acquisition process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. recited function and not only structural equivalents, but also equivalent structures.

What is claimed is:

1. A method of acquiring a wide- and/or full-azimuth seismic survey without need for a seismic spread to repeat a path once traversed, comprising:
   (a) deploying a marine seismic spread comprising a plurality of source-only tow vessels each towing one or more marine seismic sources without streamers, and one or more source-streamer tow vessels, each towing one or more marine seismic sources and one or more seismic streamers; and
   (b) positioning one or more starboard source-only tow vessels starboard of the streamers and one or more port source-only tow vessels port of the streamers, the starboard source-only tow vessels sailing and shooting only starboard and the port source-only tow vessels sailing and shooting only port of the streamers.

2. The method of claim 1 wherein the deploying of one or more source-streamer tow vessels comprises deploying a single source-streamer tow vessel.

3. The method of claim 2 comprising deploying one or more of the starboard source-only tow vessels ahead of the streamers, and one or more of the starboard source-only tow vessel behind the streamers, while deploying a similar arrangement on the port side, thereby acquiring two source lines simultaneously with split-spread configuration.

4. The method of claim 1 comprising controlling the one or more source-only tow vessels and/or the one or more source-streamer tow vessels with one or more controllers alone or in conjunction with other controllers.

5. The method of claim 4 wherein the one or more controllers comprises one or more controllers selected from PI, PD, PID, feed forward, cascade, internal feedback, model predictive, neural networks, Kalman filtering, and combinations thereof.

6. The method of claim 4 wherein the one or more controllers comprises two or more controllers, each controller adapted to compute a residual equal to a difference in a tracking point 3D coordinate position and pre-plot track and a set point based on each residual, and wherein the tracking points are selected from a center of a source, a streamer front end center, and an imaginary tracking point between a source and the streamers.

7. The method of claim 1 wherein the source-streamer tow vessel does not tow a source, or the source is inactive.

8. A method of acquiring a wide- and/or full-azimuth seismic survey without need for a seismic spread to repeat a path once traversed, and acquiring two source lines of marine seismic data simultaneously with split-spread configuration, comprising:
   (a) deploying a marine seismic spread comprising a source-streamer tow vessel towing one or more marine seismic sources and one or more seismic streamers, a port source-only tow vessel, and a starboard source-only tow vessel; and
   (b) positioning one or more starboard source-only tow vessels starboard of the streamers and one or more port source-only tow vessels port of the streamers, the starboard source-only tow vessels sailing and shooting only starboard and the port source-only tow vessels sailing and shooting only port of the streamers, deploying one or more of the starboard source-only tow vessels ahead of the streamers, and one or more of the starboard source-only tow vessel behind the streamers, while deploying a similar arrangement on the port side.

9. A system for acquiring a wide- and/or full-azimuth seismic survey without need for a seismic spread to repeat a path once traversed, comprising:
  (a) a marine seismic spread comprising a plurality of source-only tow vessels and one or more source-streamer tow vessels;
  (b) the source-only tow vessels comprising one or more starboard source-only tow vessels and one or more port source-only tow vessels, the starboard source-only tow vessels sailing and shooting only starboard and the port source-only tow vessels sailing and shooting only port of the streamers.

10. The system of claim 9 configured to acquire two source lines of marine seismic data simultaneously with split-spread configuration.

11. The system of claim 9 comprising one or more receiver positioning apparatus or systems, one or more source positioning apparatus or systems, one or more streamer steering devices, one or more source array steering devices, one or more noise attenuation apparatus or systems, and combinations thereof.

12. The system of claim 9 configured to utilize sequential source shooting or, alternatively, two or more sources configured to shoot simultaneously, with the sources being encoded so that they may be distinguished during data interpretation.

13. The system of claim 9 configured to acquire two source lines of marine seismic data simultaneously with split-spread configuration wherein the plurality of source-only tow vessels comprises two source-only tow vessels following substantially the same path or line, either port or starboard of a streamer-only tow vessel traveling substantially parallel to the path of the source-only tow vessels.

14. The system of claim 9 comprising one or more controllers adapted to control position of one or more tracking points, the tracking points selected from a center of a source, a streamer front end center, a streamer back end center, a tracking point somewhere between a center of source and a streamer front end center, a center of a plurality of streamers, and a front of any one streamer.

15. The system of claim 9 wherein the one or more source-streamer tow vessels is a single vessel, and a source associated with the source-streamer tow vessel is inactivated or removed.

* * * * *